United States Patent [19]
Yoas

[11] Patent Number: 4,929,122
[45] Date of Patent: May 29, 1990

[54] FISH PROTECTION SYSTEM FOR DAMS

[76] Inventor: Harold E. Yoas, 1110 W. Anther Ave., Redmond, Oreg. 97756

[21] Appl. No.: 316,597

[22] Filed: Feb. 24, 1989

Related U.S. Application Data

[63] Continuation of Ser. No. 13,899, Feb. 11, 1987, abandoned.

[51] Int. Cl.⁵ .............................................. E02B 8/08
[52] U.S. Cl. ...................... 405/81; 210/154; 210/159; 210/407; 405/83
[58] Field of Search .............. 405/60, 80, 81, 82, 405/83; 49/464; 160/249; 210/154, 158, 159, 407; 52/292, 296, 299; 119/3

[56] References Cited

U.S. PATENT DOCUMENTS

| | | | |
|---|---|---|---|
| 132,349 | 10/1872 | Brackett | 405/81 |
| 339,548 | 4/1886 | Haupt | 405/80 |
| 452,702 | 5/1891 | Grabill | 210/155 |
| 1,188,340 | 6/1916 | Tark | 210/158 |
| 1,798,238 | 3/1931 | Wass | 405/81 |
| 1,874,126 | 8/1932 | Schofield et al. | 210/155 |
| 2,071,670 | 2/1937 | Warner | 210/154 X |
| 2,672,985 | 3/1954 | Nordell | 210/154 X |
| 3,330,119 | 7/1967 | Griffith | 405/80 |
| 4,488,835 | 12/1984 | Eicher | 405/83 |
| 4,653,562 | 3/1987 | Moss et al. | 160/105 |

FOREIGN PATENT DOCUMENTS

| | | | |
|---|---|---|---|
| 201810 | 5/1956 | Australia | 210/154 |
| 576376 | 5/1959 | Canada | 210/154 |
| 1142589 | 2/1985 | U.S.S.R. | 405/81 |
| 1247450 | 7/1986 | U.S.S.R. | 405/127 |

*Primary Examiner*—Randolph A. Reese
*Assistant Examiner*—John Ricci
*Attorney, Agent, or Firm*—Charles N. Hilke

[57] ABSTRACT

A fish protection system for dams comprises a series of modular units which interconnect by male and female fittings on each side of the modular unit. Each modular unit comprises a casing, an inner box and an outer box for anchoring the unit to a stream bed and side frames. A screen and cleaning mechanism can be placed within the modular units where the screens clean and direct debris and fish to a fish ladder. A cleaning comb or cutting bar moves around the modular unit such that it keeps the screens clean and directs the debris and fish to the fish ladders. The cleaning comb by use of its rounded tooth form, minimizes flow at the screen in order that fingerlings won't be harmed by the cutting edge. A fish ladder provides a constant flow by maintaining the same depth of water by a hinged ladder.

16 Claims, 5 Drawing Sheets

FISH PROTECTION SYSTEM FOR DAMS

This is a continuation of co-pending application Ser. No. 013,899 filed on Feb. 11, 1987, now abandoned.

BACKGROUND OF INVENTION

1. Field of Invention

This invention relates generally to a means for cleaning screening systems which are used to divert fish from turbines in hydro-electric dams. Additionally, the invention requires a specifically designed screening system to allow cleaning. Also, a fish ladder is made hingeably adjustable.

2. Prior Art

Fletcher, U.S. Pat. No. 4,481,904 provides a screen mechanism perpendicular to the flow of the water. A moving screen at right angles to the screen mechanism is placed on the upstream side of the screen mechanism. The moving screen passes back and forth in front of the screen mechanism forcing the fish to each side of the screen mechanism where a pumped bypass is located. Soviet Union Patent No. 0696099 discloses an endless conveyor type screen which moves toward a fish outlet where a perforated tube is used to wash the dirt from the conveyor. Eicher, U.S. Pat. No. 4,488,835 provides a screen with 35 percent upslope which results in a higher flow rate along the screen. Thus, fish and debris are swept along the screen rather than impinging on the screen. The initial conception for this invention is contained in my U.S. application Ser. No. 766,977, now abandoned.

SUMMARY OF THE INVENTION

The invention comprises modular units which are constructed with an inner and outer box with at least one casing into the stream bed with reinforcing tied to the casing and to the outer box. An inner box is tied to the casing and outer box and concrete is placed within the boxes. The inner box top has side frame bolts aligning the side frame base upon which the male and female side frames extend with flexible side frame seal. The design allows a series of interlocking modular units to form a barrier in order to direct fish and debris away from the turbines. Each modular unit may contain a screen or may contain a screen and cleaning mechanism. This comprises the second portion of the invention. The screen and cleaning mechanism comprises a drive sprocket and an idler sprocket connected by a drive chain to which is attached at least one cleaning comb. A bar screen with screen supports is cleaned by at least one cleaning comb where one or more brushes cleans the cleaning comb. A screen frame seal is provided such that the cleaning combs can slide through without allowing water through. The screen and cleaning mechanism slides into the side frame channels of the modular unit.

A second embodiment of the screen and cleaning mechanism comprises a plurality of screen plates and a plurality of tapered screen separators. Either a guided tooth cleaning comb or a cutting bar is used to scrape clean the screen plates. A plurality of support members fastens the screen plates and tapered screen plate separators. The guided tooth cleaning comb is continuously engaged between the screen plates.

It is an object of this invention to provide an easily constructable fish protection system for new dams or to be retrofitted on existing dams.

It is an object of this invention to provide easily serviceable dam fish protection systems.

It is an object of this system to direct the fish toward the fish ladders.

It is an object of this system to allow easy replacement of modular parts.

It is an object to keep the screens clean so that an adequate amount of water flows to the turbines.

It is a final object to protect the fish from the screen by means of the teeth of the cleaning comb slowing the flow of water before cleaning the debris from the screen.

DETAILED DESCRIPTION OF THE PREFERRED EMBODIMENT

Figure 1:
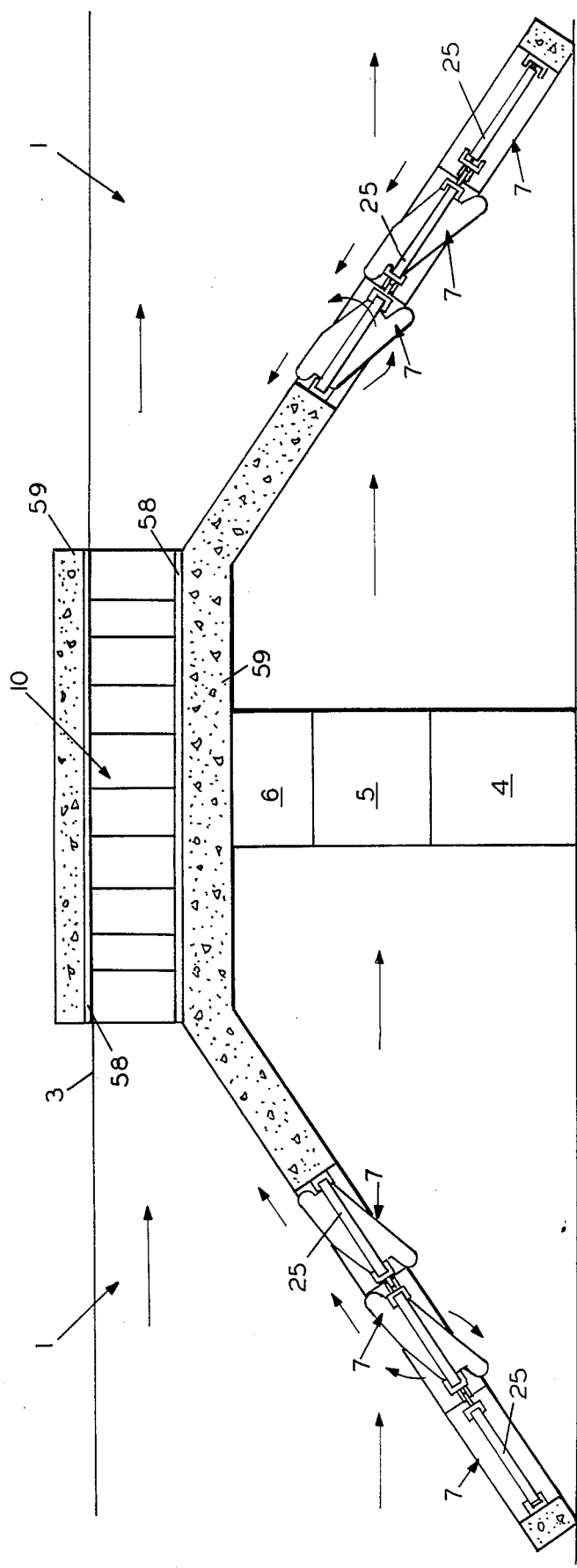
FIG. 1 is a top plan view of a dam with a modular system installed with fish ladders.

FIG. 1 is an overall view of the invention. The stream 1 flows between the dam stream bank 2 and the fish ladder stream bank 3. A dam 4 with spillway 5 and turbines 6 with the hinged fish ladder 10 span the stream 1 from dam stream bank 2 to fish ladder stream bank 3. The modular units 7 are positioned angularly from the dam stream bank 2 to the hinged fish ladder 10 both upstream and downstream. Fish ladder side seals 58 are fixably attached to the hinged fish ladder 10 to prevent water flowing by the fish ladder channels 59.

Figures 2, 3:
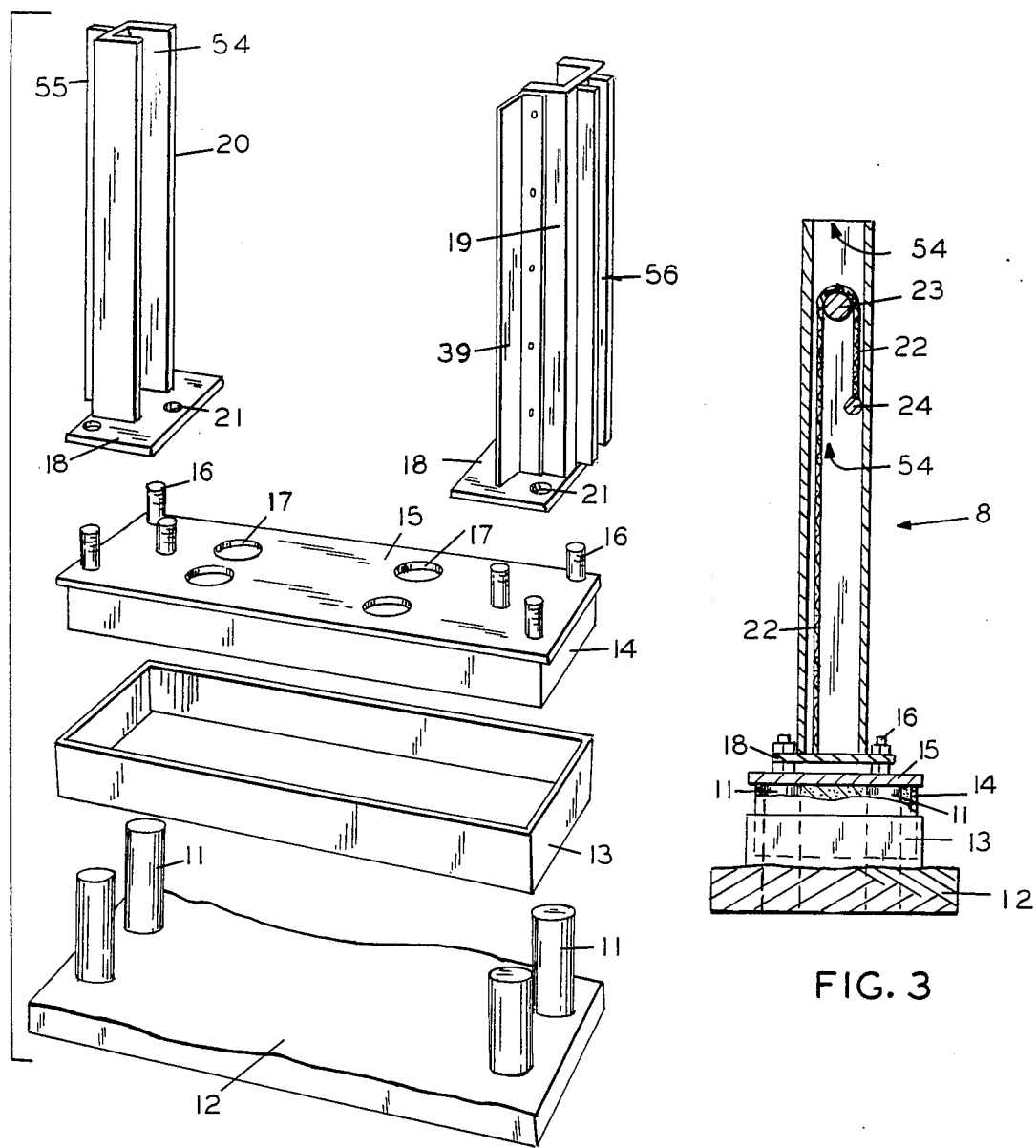
FIG. 2 is an exploded perspective view of a modular unit.
FIG. 3 shows a fixed screen modular unit.

FIG. 2 is an exploded view of the modular unit 7 in perspective. The casings 11 are driven or drilled into the stream bottom 12 and filled with concrete. The outer box 13 fits around the casings 11. The inner box 14 fits within the outer box 13 and also outside of the casings 11. The inner box top 15 contains concrete pour holes 17. Side frame bolts 16 are firmly attached to the inner box top 15. Male side frame 20 and female side frame 19 attach through the side frame bolts 16 by positioning the side frame bolt holes 21 such that the side frame bolts 16 can pass through the side frame base 18. Concrete is poured in the concrete pour holes 17 to firmly attach the modular unit 7 to the stream bottom 12. Note that the male side frame 20 contains a side frame channel 54 and a male fitting 55. Similarly, female side frame 19 contains a side frame channel 54 and a female fitting 56. Two modular unit seals 41 are fixed to female fitting 56. Side frame seals 39 are attached to both the female side from 19 and the male side frame 20 on opposite sides.

FIG. 3 shows a modular unit 7 in the configuration of a screen modular unit 8. This view shows the casings 11, the stream bottom 12, outer box 13, inner box 14, inner box top 15, side frame base 18, and side frame bolts 16 in their finally constructed positions. A floating roller 23 over which the screen 22 is held by a counterweight 24 prevents debris from passing through. The floating roller 23 floats within the confines of the side frame channels 54. (See FIG. 2).

Figure 4:
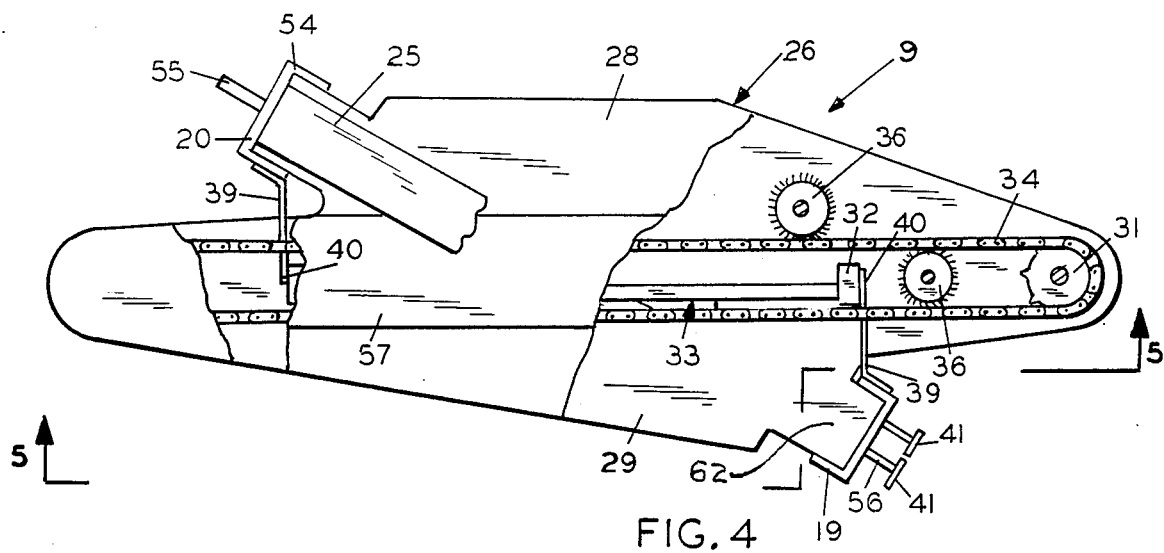
FIG. 4 is a top plan view of a modular unit with portions of the top frame broken away.
Figure 5:
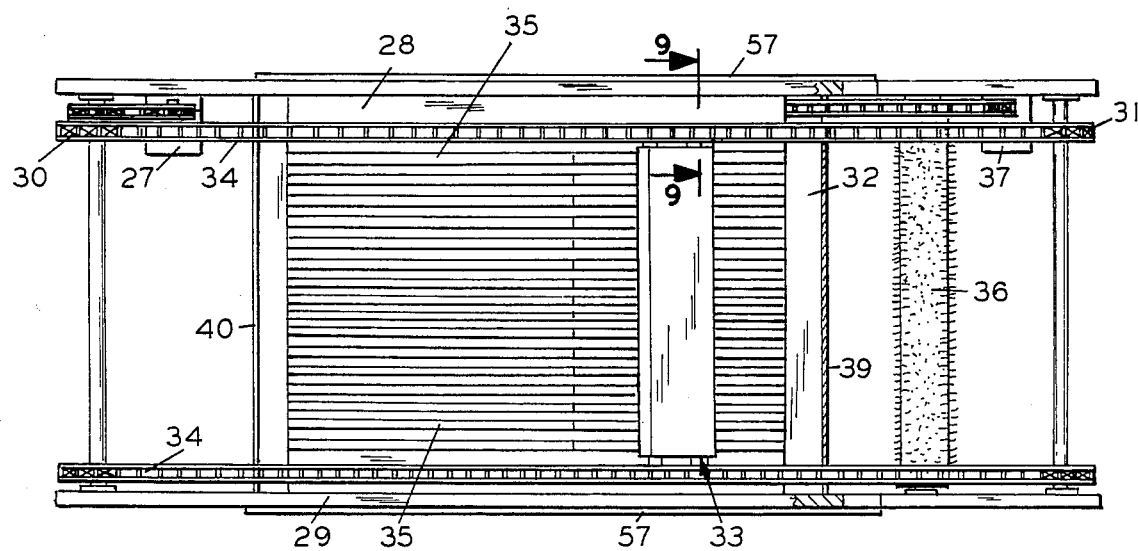
FIG. 5 is an elevational view of the modular units with the screen and cleaning mechanism.

FIGS. 4 and 5 is a perspective view of the modular unit 7 constructed as a screen cleaning modular unit 9. The screen and cleaning mechanism 26 by means of tabs 62 slides within the side frame channels 54 formed in the female side frame 19 and male side frame 20 until the screen and cleaning mechanism 26 rests on the inner box top 15 (not shown). A solid gate 25 slides through the same channels 54 and rests on top of the screen and cleaning mechanism 26. A top frame 28 and a bottom frame 29 are held together by the screen frame 32. Screen and cleaning mechanism seals 57 are attached to the top frame 28 and the bottom frame 29. A variable speed drive assembly 27 is supported by the top frame 28 and drives the drive sprocket 30. An idler sprocket 31 is located between the bottom and top frame. The drive chains 34 are driven by the drive sprocket and rotate around the idler sprocket 31. A cleaning comb 33 is fixably attached to the drive chain 34. The bar screen 35 is positioned by the screen frame 32. Comb cleaning brushes 36 rotate by means of a variable speed drive brush motor 37. The guide tongues position the cleaning comb 33 as is standard. Side frame seals 39 meet the side frame seals 40 such that the cleaning comb can slide through. Modular unit seals 41 are shown on the female side frame 19.

Figure 6:
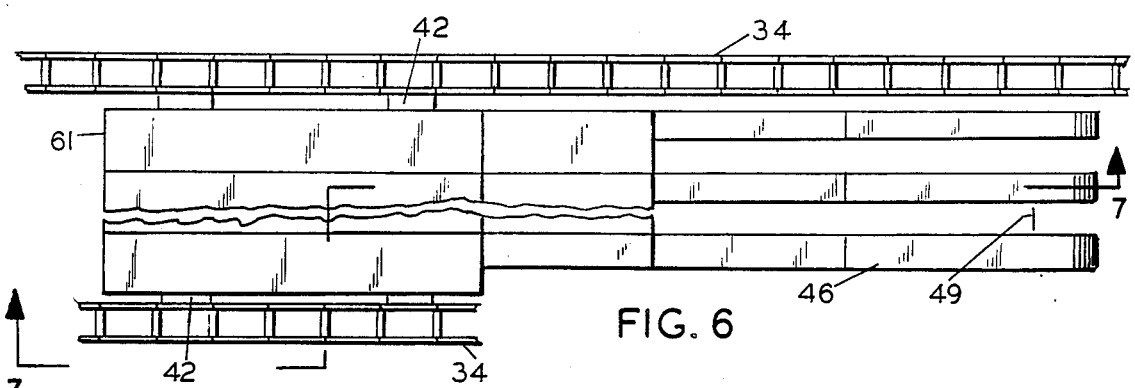
FIG. 6 is a top view of the cleaning comb.
Figure 7:
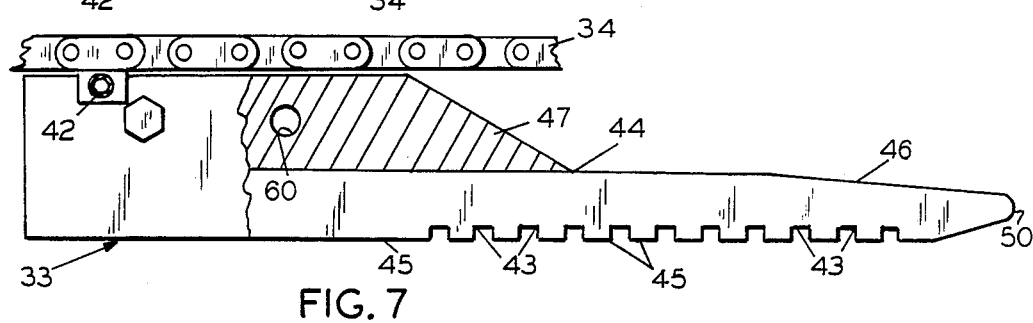
FIG. 7 is a sectional view of the comb taken along line 7—7 of FIG. 6.
Figure 8:
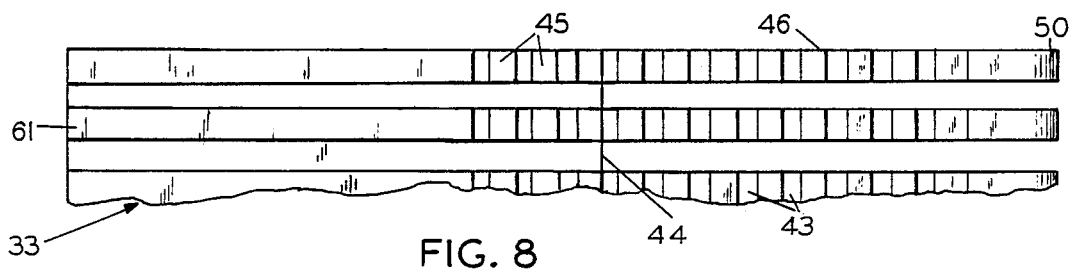
FIG. 8 is a bottom view of a portion of the cleaning comb.

FIGS. 6, 7 and 8 are detailed views of the cleaning comb 33. Each tooth structure 61 is preferably die cast and assembled into a cleaning comb 33 in the usual manner by use of assembly holes 60. The cleaning comb mounting tapped holes 42 attach the cleaning comb 33 to the drive chain 34. A support cleaning edge 45 of the cleaning comb 33 has a plurality of cutting grooves 43 cast crosswise into the cleaning comb 33. The tooth frame 47 supports the teeth 46. The screen cutting edge 44 additionally cleans the bar screen 35 (see FIG. 9). The tooth 46 is rounded at its end 50. The bar screen space 49 provides space for the bar screen 35 to pass through.

Figure 9:
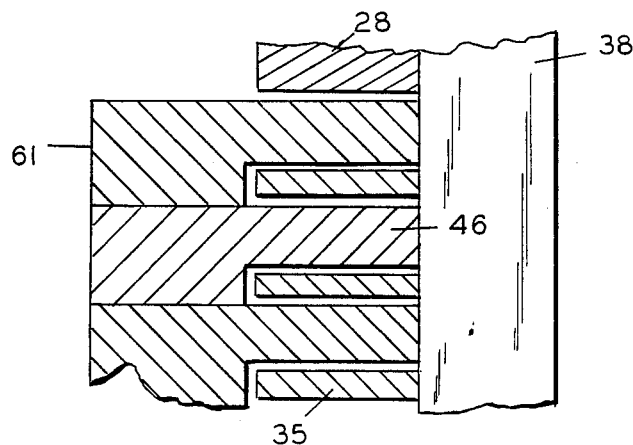
FIG. 9 is an enlarged section taken along line 9—9 of FIG. 5.

FIG. 9 is a section of the cleaning comb 33 in the bar screen 35. The teeth 46 slide within the bar screen 35 touching the screen support 38. The tooth structure 61 is shown.

Figure 10:
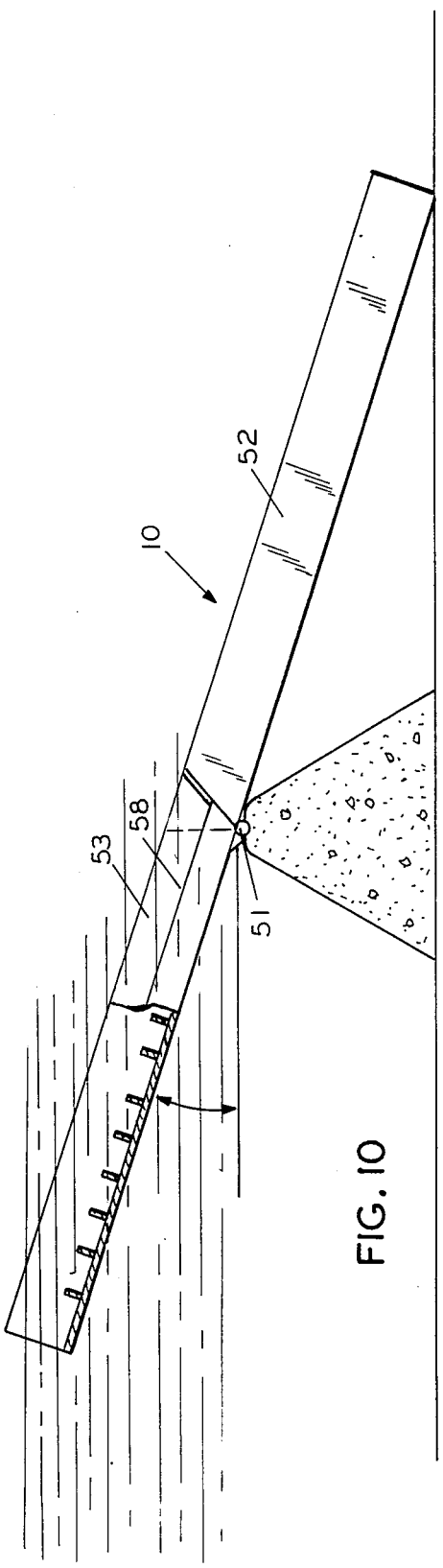
FIG. 10 is a view of the hinged ladder.

In FIG. 10 the hinged fish ladder 10 is shown in side view. The hinge 51 rests upon the top of the dam minimum water level where the flow regulating fish ladder 53 with fish ladder side seals 58 is on the upstream side of the dam and the stationary fish ladder 52 is on the downstream side of the dam.

Figure 11:
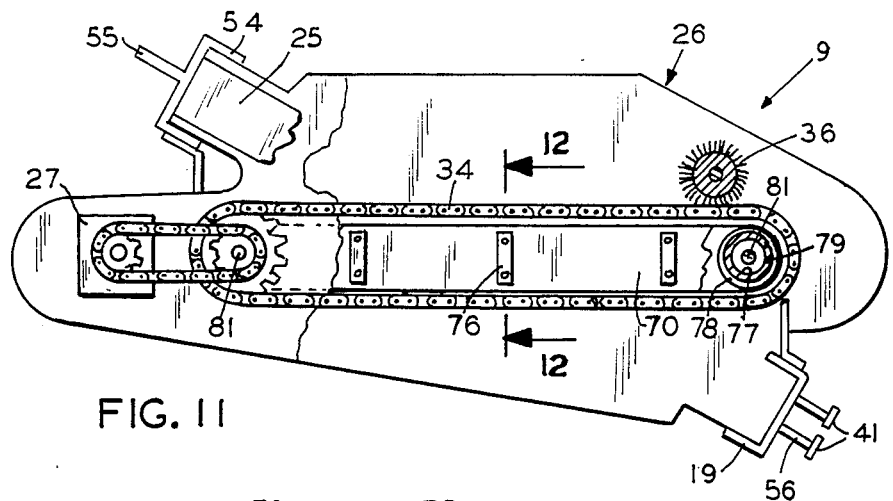
FIG. 11 is a top cut-away view of the modular unit.

FIGS. 11, 12, 13, and 14 show the second embodiment of the screen and cleaning mechanism 26. In FIG. 11, the screen cleaning modular unit 9 and screen and cleaning mechanism 26 are shown. Note that the screen plates 70 are adjacent to the driving chain 34 on both the upstream and downstream sides of the modular unit 9. The screen plates 70 are held together by the support members 76. A shaft 81 is placed within an end support 79 at opposite sides of the screen plate 70. A shaft clearance hole 77 in screen plates 70 receives the end support 79. A spacer ring 78 surrounds the end support 79 to support the opening between each screen plate 70.

Figure 12:
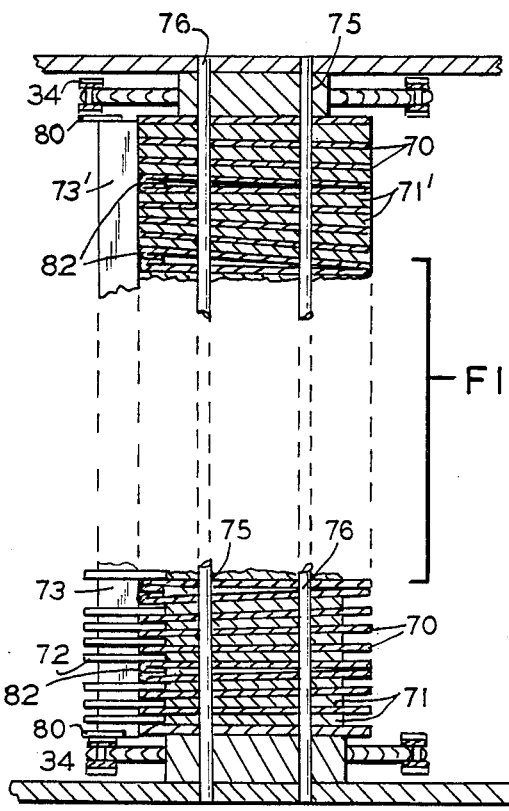
FIG. 12 is an elevation view of the screen and cleaning mechanism showing the comb support bar with guided teeth cleaning comb and showing the cutting bar.

In FIG. 12, the screen plates 70 are separated by tapered screen plate separators 71 with the thinnest edge upstream. The comb support bar 73 is attached to the drive chain 34. The guided teeth cleaning comb 72 is attached to the comb support bar 73. The screen plate 70 and tapered screen plate separators 71 each contain support holes 75 of any shape through which a support member 76 of any shape is used to fixably attach the plurality of screen plate 70 to the plurality of tapered screen plate separators 71. A correction spacer is used to adjust for the tapered screen plate separators 71. The guided teeth cleaning comb 72 and the comb support bar 73 can be replaced by a cutting bar 73' with the tapered screen plates separator 71' which is the same length as the screen plates 70.

Figure 13:
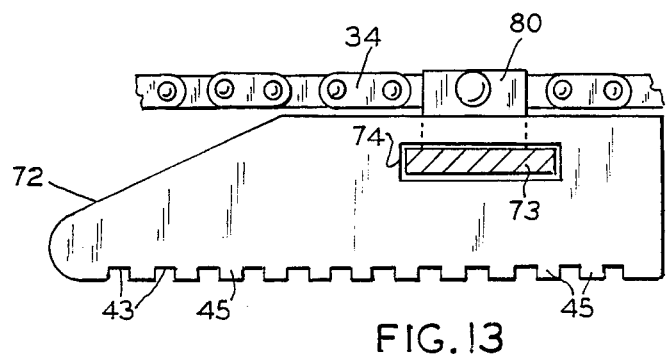
FIG. 13 is an elevation view of the cleaning comb.

FIG. 13 shows the guided tooth cleaning comb 72 slideably mounted on the comb support bar 73 by means of the cleaning comb slot 74. The comb support bar 73 is attached to the drive chain 34 by means of the comb support bar mounting 80. Note that the guided tooth cleaning comb 72 can slide freely on the comb support bar 73.

Figure 14:
FIG. 14 is a section view of a correction spacer.

FIG. 14 shows in cross section the overlap bended ends of the correction spacer 82 to compensate for the tapered screen plate separators 71.

In operation the modular units 7 are constructed on the upstream and downstream portion. The modular unit seals 41 minimize leakage between the modular units 7. The modular units 7 are interconnected at an angle to the flow of the stream. The modular units 7 are designed such that several screen and cleaning mechanisms 26 can fit on top of one another. The female side frame 19 and the male side frame 20 can be constructed of various heights depending on the depth of the stream. Of course, there would be a respective increase in the strength and size of the respective parts of the modular unit 7. The screen modular unit 8 is used primarily next to or adjacent to the stream bank, in FIG. 1 the first modular unit 7 is a screen modular unit 8 adjacent to the dam stream bank 2. The number of screen and cleaning mechanisms 26 used specifically relates to the flow through the turbines 6.

The screen and cleaning mechanism 26 operates by means of the variable speed drive assembly 27 turning the drive sprocket 30. This causes the drive chain to move which of course causes the cleaning comb 33 to begin its action. The cleaning comb 33 moves along the bar screen 35 and then rotates around the drive sprocket 30. This particular action takes place on the upstream side of the screen and cleaning mechanism 26. The cleaning comb 33 then passes through the screen frame seal 40 to the downstream side of the screen and cleaning mechanism 26. The cleaning comb 33 then passes through the comb cleaning brushes 36 which are rotating by means of the variable speed drive brush motor 37. This action cleans the teeth 46 of the cleaning comb 33. The cleaning comb 33 then passes around the idler sprocket 31 and by means of guide tongues are positioned in the bar screen 35. Again, the cleaning comb 33 passes through the screen frame seal 40.

In the upstream position, the cleaning comb 33 glides along the bar screen 35 cutting debris by means of the screen cutting edges 44 and the cutting grooves 43. The fish are moved away from the screen by the rounded tooth end 50 which allows fish, particularly fingerlings, time to get out of the way of the moving cleaning comb 33. The cleaning comb 33 on the upstream side of the upstream modular units 7 always moves towards the fish ladder. This helps direct the fish swimming downstream towards the fish ladder. The cleaning comb 33 on the downstream side of the downstream modular unit 7 always moves toward the fish ladder. This helps direct the fish swimming upstream towards the fish ladder.

In the second embodiment the screen plates 70 are lengthened so that the guided teeth cleaning comb 72 is constantly positioned between the screen plate 70 on both the upstream side and downstream side. This eliminates any difficulty of reinserting the teeth 46 of the cleaning comb 33 in the bar screen 35 with each revolution of the cleaning comb 33. The tapered screen plate separator is thinner on the upstream side in order to allow debris to flow between the screen plates without getting trapped. Because of the difference in thickness of each end of the tapered screen plate separator 71 it is necessary to provide a correction spacer 82 for proper arrangement of the screen plates 70. Note that the guided tooth cleaning comb 72 slides on the comb support bar 73 in order to allow for the adjustments caused by the tapered screen plate separator 72 and the correction spacer 82.

The guided tooth cleaning comb 72 and comb support bar 73 can be replaced by the cutting bar 73'. With this adjustment, the tapered screen plate separators 71 are lengthened so that its ends correspond to the screen plates 70. Thus, the debris is cut by the cutting bar 73' at the tapered screen plate separators 71'.

The hinged fish ladder 10 allows a constant flow of water through the flow regulating fish ladder 53 and down the stationary fish ladder 52. The flow regulating fish ladder 53 is regulated by means of the hinge 51 to position the flow regulating fish ladder 53 a regulated constant distance below the water level of the dam. This allows for regulated constant flow of water through the hinged fish ladder 10 regardless of the water level in the dam 4. The hinge 51 is located at the dam minimum water level.

From this detailed description of the fish protection system for dams, it will be understood that I have provided a novel and unique system. It is to be understood that the form of this invention as shown and described is to be taking as preferred examples of the invention, and that this invention is not limited to the exact arrangement of parts shown in the accompanying drawings or described in the specification. Various changes in the details of construction as to shape, size and arrangement of parts may be resorted to without changing the nature of the invention, the scope of the novel concepts thereof, or the scope of the following claims.

I claim:

1. A fish protection system for dams comprising:
   (a) at least one modular unit where said modular unit comprises:
      (i) frame means;
      (ii) means for attaching said modular unit to a stream bed which comprises:
         at least one casing of said modular unit fixably attached to a stream bed; an outer box of said modular unit positioned around the outside of said casing and resting on said stream bed; and an inner box of said modular unit positioned inside of said outer box and around the outside of said casing where concrete fixably attaches said inner box and said outer box to said casing;
      (iii) means for attaching said frame means to the means for attaching the modular unit to the stream bed;
      (iv) a stationary screen and moving cleaning mechanism which is slideably positionable within said frame means for diverting fish away from turbines in a dam.

2. The fish protection system for dams for claim 1 where said means for attaching frame means for the means for attaching the modular unit to the stream bed comprise:
   (f) an inner box top fixably attached to said means for attaching the modular unit to the stream bed; and
   (g) at least one side frame bolt fixably attached to said inner box top.

3. The fish protection system for dams of claim 1 where said frame means comprise:
   (h) at least two side frame bases which fixably attach to said means for attaching frame means to the means for attaching modular unit to the stream bed; and
   (i) at least two side frames each respectively fixably attached to said side frame base where said side frames each contain a side frame channel adjacent to one another.

4. The fish protection system for dams of claim 3 where one of said two side frames contains a male fitting opposite said channel and the other of said two side frames contains a female fitting opposite said channel.

5. The fish protection system for dams of claim 4 where said female fitting additionally comprises a modular unit seal.

6. The fish protection system for dams for claim 4 where said system comprises at least two modular unit where said male fitting of one side frame of one modular unit cooperatively engages said female fitting of said side frame of the other modular unit.

7. The fish protection system for dams of claim 1 where said screen and cleaning mechanism comprises:
   (j) a top frame and a bottom frame each respectively containing at least one tab fixably attached to a screen frame;
   (k) a bar screen fixably attached to said screen frame;
   (l) at one end of said adjacent top frame and bottom frame is a drive sprocket operable by a variable speed drive assembly and interconnected to an idler sprocket located at the opposite end of said adjacent top frame and bottom frame by means of a drive chain;
   (m) a variable speed drive brush motor attached to said top frame operates at least one brush positioned between said top frame and said bottom frame; and
   (n) at least one cleaning comb attached to said drive chain.

8. A fish protection system for dams of claim 7 where said screen and cleaning mechanism additionally comprises:
   (o) guide tongues fixably attached to the screen frame; and
   (p) a screen frame seal attached to the screen frame and adjacent to a side frame seal attached to said side frame.

9. The fish protection system for dams of claim 7 where the cleaning comb comprises:

(q) at least one tooth structure comprising a tooth joined to a tooth frame which forms a screen cutting edge where said tooth is rounded at its leading end and where the support cleaning edge located at the base of the tooth structure has at least one cutting groove;

(r) mounting tapped holes through said cleaning comb join the tooth structure to the drive chain.

10. The fish protection system for dams of claim 7 where the cleaning comb comprises:

(s) more than one tooth structure comprising a tooth joined to a tooth frame which forms a screen cutting edge where said tooth is rounded at its leading end, and where a support cleaning edge located at the base of the tooth structure has at least one cutting groove;

(t) assembly holes for joining each tooth structure;

(u) mounting tapped holes to join the tooth structure to the drive chain.

11. The fish protection system for dams of claim 1 additionally comprising:

(v) a flow regulating fish ladder hingeably connected to a stationary fish ladder where a hinge is fixably located at a dam minimum water level.

12. The fish protection system for dams of claim 1 where said screen and cleaning mechanism comprises:

(j) a top frame and a bottom frame each respectively containing at least one tab fixably attached to a support member;

(k) a plurality of screen plates with a plurality of tapered screen plate separators with the thin edge upstream and with at least one correction spacer interconnected to said support member;

(l) at one end of said adjacent top frame and bottom frame is a drive sprocket operable by a variable speed drive assembly and interconnected to an idler sprocket located at the opposite end of said adjacent top frame and bottom frame by means of a drive chain;

(m) a variable speed drive brush motor attached to said top frame operates at least one brush position between said top frame and said bottom frame; and (n) a plurality of guided teeth cleaning combs slideably attached to a comb support bar which is attached to said drive chain.

13. The screen and cleaning mechanism of claim 12 where said plurality of guided teeth cleaning combs are continuously engaged between said screen plates.

14. The screen and cleaning mechanism of claim 12 where said tapered screen plate separators are arranged such that the narrowest end of the tapered screen plate separators is pointed upstream.

15. The fish protection system for dams of claim 1 where said screen and cleaning mechanism comprises:

(j) a top frame and a bottom frame each respectively containing at least one tab fixably attached to a support member;

(k) a plurality of screen plates with a plurality of tapered screen plate separators with the thin edge upstream and with at least one correction spacer interconnected to said support member and where said screen plates and said tapered screen plate separators are of equal length;

(l) at one end of said adjacent top frame and bottom frame is a drive sprocket operable by a variable speed drive assembly and interconnected to an idler sprocket located at the opposite end of said adjacent top frame and bottom frame by means of a drive chain;

(m) a variable speed drive brush motor attached to said top frame operates at least one brush position between said top frame and said bottom frame; and (n) a cutting bar attached to said drive chains.

16. The screen and cleaning mechanism of claim 15 where said tapered screen plate separators are arranged such that the narrowest end of the tapered screen plate separators is pointed upstream.

* * * * *